(No Model)

P. INGLART.
Dumping Cart.

No. 241,665. Patented May 17, 1881.

WITNESSES.

INVENTOR

Philip Inglart.

BY

ATTORNEY.

UNITED STATES PATENT OFFICE.

PHILIP INGLART, OF BALTIMORE, MARYLAND, ASSIGNOR OF ONE-HALF TO FREDERICK EHRMAN, OF SAME PLACE.

DUMPING-CART.

SPECIFICATION forming part of Letters Patent No. 241,665, dated May 17, 1881.

Application filed March 3, 1881. (No model.)

*To all whom it may concern:*

Be it known that I, PHILIP INGLART, of Baltimore city, State of Maryland, have invented certain new and useful Improvements in Dumping-Carts; and I hereby declare the same to be fully, clearly, and exactly described as follows, reference being had to the accompanying drawings, in which—

Figure 1:
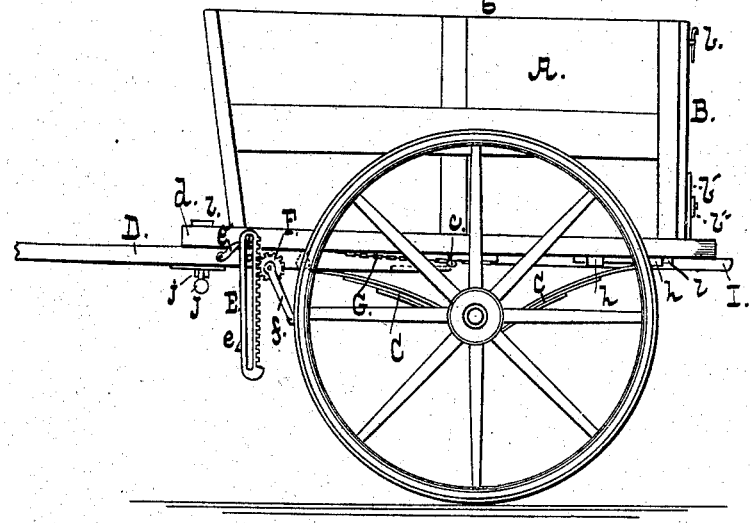
Figure 2:
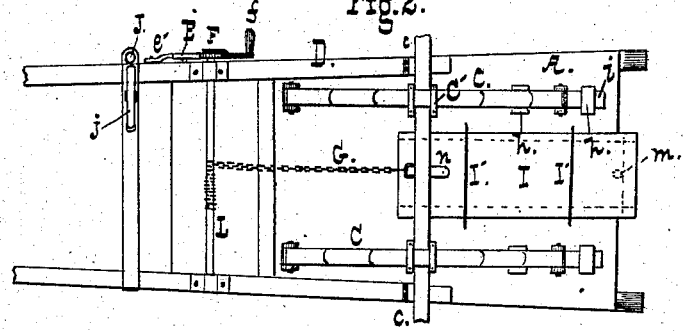
Figure 3:
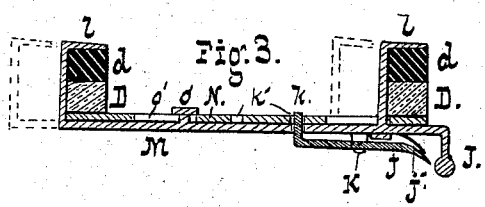

Figure 1 is a side elevation, and Fig. 2 is a bottom plan, of the cart, and Fig. 3 is a sectional view of the device for holding the body down upon the shafts.

My invention relates, in general, to dumping-carts; and it has for its object to provide a cart adapted to dump in the ordinary way, or to discharge its contents through a chute, according to the necessities of the case. These features eminently fit the cart for use as a dumping coal-cart, as the coal-hole is sometimes found in the sidewalk near the curb, sometimes in the form of a cellar-way near the wall of the house, and occasionally in the wall itself.

The ordinary chute-carts serve well to discharge the coal into the cellar-way or window; but they are of no advantage when the coal-hole is near the curb, as the cart, in order to bring the end of its chute over the hole, must stand so far out into the street as to practically stop the thoroughfare for vehicles.

I have devised a cart adapted for use as an ordinary dumping-cart or as a chute-cart, and have combined its chute and tilting mechanism in such manner that the chute is automatically retracted in the act of tilting the body back again upon its shafts.

The invention will be first described, and then pointed out in the claims.

A is the body of the cart, having the usual tail-board, B, secured by staples and catches $b$, and provided with a hinged end-gate, $b'$, secured by a latch, $b''$.

C C are the springs, which are clipped to the axle and at their forward ends to the body of the cart. At their rear ends they are pivoted to bars $i$, which slide through bearings $h$ as the springs play.

D are the shafts, hinged to the body at $c$, and carrying a transverse shaft, L, provided at its end with a pinion, F, and crank $f$. The pinion meshes with a rack, E, that is attached at its upper end to the body of the cart, and has a stop or lug, $e$, with which a pawl, $e'$, engages when the body is tilted.

I' are carriers, upon which the chute I rests. The latter consists of the usual sheet-metal troughs, two in number, having the edges of the under one overlapping those of the upper, so that the two telescope under the cart.

A spring-catch, $n$, on one section of the chute enters holes $m$ at either end of the other, when retracted or extended, whereby the two maintain their proper relative position.

A chain, G, leads from the chute to the shaft L, and is wound round the latter, as shown.

The front bars, $d$, are held down upon the shafts by a novel device, (shown in Fig. 3,) which subserves most important ends, as will be at once evident.

N is a plate connecting the shafts D, and below it slides a plate, M, having lugs $l\ l$, which are bent at their upper ends to secure the bars $d$. The plates are held together by a bolt, $o$, which is secured to the bar M, and slides in a slot, $o'$, in the bar N. The outer end of the plate or bar M is bent downward and terminates in a hand-knob, J.

A catch, $j$, is pivoted in bearings K on the under side of the bar M, and carries a pin, $k$, which passes through a hole in the bar M and into one of the two holes $k'$ in the upper bar, locking the two securely together. A spring, $j'$, normally depresses the outer end of the catch, which falls immediately behind the knob J, so that when the latter is grasped the catch is necessarily released.

In operation, to tilt the body the knob is seized and the catch is lifted, retracting the pin $k$ from the hole $k'$, and the bar M is then pushed back, as shown in dotted lines. On turning the crank $f$ the body is tilted until the pawl $e'$ falls under the lug $e$, when the body is securely held in its tilted position. In canting the body the chain L is paid out, allowing the chutes to be retracted for use, if necessary. In case the coal-hole is close to the curb the chute is run out but a short distance, or, indeed, need not be run out at all, and the gate $b'$ being opened the coal is discharged into the hole. When the coal is to be dumped into a cellar-way the chutes are run out in the usual way. In either case, as the wagon-body is tilted back upon the shafts, the rotation of the shaft L winds up the chain G and draws the chute into place under the cart. Finally, the bar M is drawn forward, bringing the lugs l over the bars d, locking the body in place.

The rack E is made readily removable, and on casting loose the chain from the shaft L the chute may be removed, when the cart may be used as an ordinary dumping-cart for wood, bricks, or other materials. The rack and chutes would not interfere with such use, but are preferably removed so as to be out of the way.

The device for securing the body upon the shafts obviates the objection to the conventional staple and stick, as the shafts are not weakened by boring or mortising, and the difficulty is not experienced with the described device that results from the refusal of the slots to register with the staples.

What I claim is—

1. The combination, in a dumping-cart, of tilting mechanism and a sliding chute attached thereto, substantially as described, whereby the tilting of the body releases the chute and permits it to run or be drawn out.

2. In a dumping-cart, a sliding chute connected with the tilting mechanism by means of a chain, whereby the chute is retracted as the body is moved from an inclined to a horizontal position, as set forth.

3. In a dumping-cart, a chute running on carriers beneath the bed and connected by means of a chain with a revolving shaft which actuates the tilting mechanism, as set forth.

4. In a dumping-cart, a transverse bar connecting the shafts and a lug or lugs adapted to embrace the front bars of the body and secure them upon the shafts, in combination with a locking-catch, as set forth.

5. In combination with the body having the depending rack and pawl, the rotary shaft and crank f, and chain G and chute I, as set forth.

6. In combination with the bar N, the bar M, provided with lugs l, knob J, and spring-catch j, as set forth.

7. In combination with the bar N, having slots o' and holes k', the bar M, having bolt o, pivoted catch j, and knob J, as set forth.

PHILIP INGLART.

Witnesses:
R. D. WILLIAMS,
JNO. T. MADDOX.